US 008860799B2

(12) United States Patent
Chang et al.

(10) Patent No.: US 8,860,799 B2
(45) Date of Patent: Oct. 14, 2014

(54) ALIGNMENT SYSTEM AND METHOD FOR OPERATING THE SAME

(75) Inventors: Yung Cheng Chang, Hsinchu (TW); E Min Chou, Hsinchu (TW); Yu Heng Jan, Hsinchu (TW)

(73) Assignee: Source Photonics, Inc., Chatsworth, CA (US)

( * ) Notice: Subject to any disclaimer, the term of this patent is extended or adjusted under 35 U.S.C. 154(b) by 444 days.

(21) Appl. No.: 13/009,513

(22) Filed: Jan. 19, 2011

(65) Prior Publication Data

US 2011/0193951 A1 Aug. 11, 2011

(30) Foreign Application Priority Data

Feb. 9, 2010 (TW) ................................. 99103895 A

(51) Int. Cl.
*H04N 7/18* (2006.01)
*G02B 21/00* (2006.01)
*G02B 27/62* (2006.01)
*G02B 21/36* (2006.01)

(52) U.S. Cl.
CPC ............ *G02B 21/0016* (2013.01); *G02B 27/62* (2013.01); *G02B 21/365* (2013.01)
USPC ................ 348/95; 348/79; 345/629

(58) Field of Classification Search
CPC ... G02B 21/0016; G02B 21/365; G02B 27/62
USPC ............................................ 348/79; 382/145
See application file for complete search history.

(56) References Cited

U.S. PATENT DOCUMENTS

| | | | | |
|---|---|---|---|---|
| 5,066,477 | A | * | 11/1991 | Zell et al. ........................ 423/479 |
| 5,086,477 | A | * | 2/1992 | Yu et al. .......................... 382/145 |
| 6,947,074 | B2 | * | 9/2005 | Koseki et al. ............... 348/240.1 |
| 7,397,940 | B2 | * | 7/2008 | Willems van Dijk et al. .............................. 382/144 |

FOREIGN PATENT DOCUMENTS

TW 295675 1/1997

OTHER PUBLICATIONS

Office Action dated Mar. 7, 2014 from the Taiwan counterpart application 099103895.
English abstract translation of the office action dated Mar. 7, 2014 from the Taiwan counterpart application 099103895.
English abstract translation for Taiwan publication 295675, listed above, Jan. 11, 1997.
Office Action dated Jul. 1, 2013 from Taiwan counterpart application TW 099103895 which cites US 5086477 and US 6947074.
English translation of Taiwan counterpart application TW 099103895, Jul. 1, 2013.

* cited by examiner

*Primary Examiner* — Andy Rao
*Assistant Examiner* — Tyler Edwards
(74) *Attorney, Agent, or Firm* — WPAT, P.C.; Anthony King; Kay Yang

(57) ABSTRACT

An alignment system includes a stage configured to retain an object, an image-capturing device configured to capture the image of the field of view of the microscope, and a processing module configured to generate a virtual mask and superimpose the virtual mask with the image of the object. In one embodiment of the present invention, a method for operating a virtual mask system includes the steps of generating a virtual mask, placing a first object on a stage, capturing at least one image of the first object, and superimposing the virtual mask with the image of the first object by adjusting a position or an inclined angle of the stage or adjusting a capturing position of an image-capturing device by considering at least the virtual mask and the image of the first object.

21 Claims, 4 Drawing Sheets

ALIGNMENT SYSTEM AND METHOD FOR OPERATING THE SAME

BACKGROUND OF THE INVENTION

1. Technical Field

The present invention relates to an alignment system and method for operating the same, and more particularly, to an alignment system and method for operating the same that superimposes a virtual mask with the image of the real object to achieve high-precision alignment.

2. Background

In a die bonding process particularly for passive alignment of optical components, the alignment between dies or dies and a lens array is very important. In conventional passive alignment technology, a flat and transparent glass, which involves coating a patterned chrome film serving as the mask pattern on the surface of the glass, is used to superimpose with the real object for leading the real object to be placed in the designed position.

In addition, the mask is needed to be modified when a new chip or lens is used; for example, the mask is needed to be replaced with different masks while bonding dies with different dimensions/pattern on the same substrate. However, creating a new mask is time-consuming and not cost-effective. Therefore, there is a need for a virtual mask system and method for operating the same such that the operator can perform the die bonding process with the same precision and accuracy, but with greater efficiency and flexibility.

SUMMARY

One aspect of the present invention provides a virtual mask system and method for operating the same that superimposes the image of the virtual mask with the image of the real object to achieve high-precision alignment.

An alignment system according to this aspect of the present invention comprises a stage configured to retain an object, an image-capturing device configured to capture the image of the field of view of the microscope, and a processing module configured to generate a virtual mask and superimpose the virtual mask with the image of the field of view of the microscope.

In one embodiment of the present invention, a method for operating an alignment system comprises the steps of generating a virtual mask with several sets of patterns on it, placing a first object on a stage, capturing the image of the first object, adjusting the position or the inclined angle of the first object through the stage or adjusting the capturing position of an image-capturing device to superimpose the one set of patterns on the virtual mask with the image of the first object, picking up the first object, placing a second object on the stage, capturing the image of the second object, adjusting the position or the inclined angle of the second object through the stage or adjusting the capturing position of an image-capturing device to superimpose another set of patterns on the virtual mask with the image of the second object, placing the first object on the second object.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes as those of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention are illustrated with the following description and upon reference to the accompanying drawings in which.

DETAILED DESCRIPTION

Figure 1:
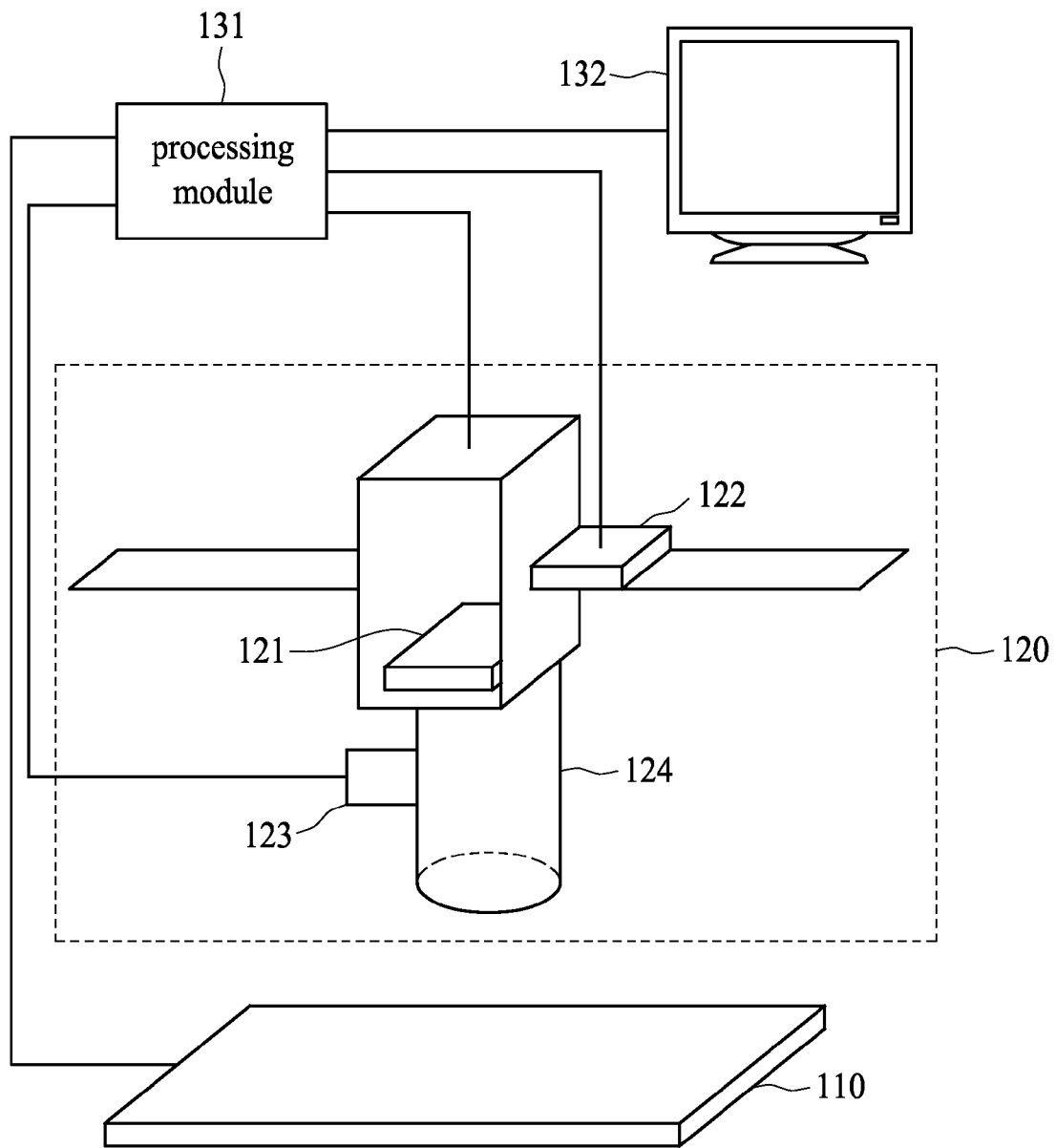
FIG. 1 illustrates a virtual mask system according to one embodiment of the present invention.

FIG. 1 illustrates a virtual mask system 100 according to one embodiment of the present invention. The virtual mask system 100 comprises a stage 110 configured to retain an object, an image-capturing device 120 configured to capture the image of the field of view of the microscope, a processing module 131 configured to generate a virtual mask and superimpose the virtual mask with the image of the object, and a display 132. In one embodiment of the present invention, the object can be a substrate (submount) or a device such as the Vertical-Cavity Surface-Emitting Laser (VCSEL), Photodiode (PD), chip, a chip array, lens or lens array. In one embodiment of the present invention, the image-capturing device 120 can be configured to capture images of different portions of the object by adjusting the stage position or the zooming rates of the microscope.

In one embodiment of the present invention, the image-capturing device 120 comprises an image sensor 121, a microscope 124 positioned between the image sensor 121 and the object, a position-sensing device 122 configured to provide a capturing position where the image-capturing device 120 captures the image of the object, and a zoom controller 123 configured to control a zooming rate of the image-capturing device 120 and the field of view of the microscope 124. In one embodiment of the present invention, the microscope 124 is a lens set or a reflective imaging lens set. In one embodiment of the present invention, the processing module 131 is configured to control the zoom controller 123 and to control the capturing of the image of the object by using the image sensor 121 and the microscope 124 by considering at least the capturing position from the position-sensing device 122 or the position of the stage 110 from the position-sensing device. In one embodiment of the present invention, the position-sensing device 122 can be liner encoder or rotary encoder.

In one embodiment of the present invention, the processing module 131 is configured to generate a virtual mask and superimpose the virtual mask with the image of the object. In one embodiment of the present invention, the superimposing of the virtual mask with the image of the object is performed by adjusting a position or an inclined angle of the stage 110 by considering the virtual mask and the image of the first object, or by adjusting the capturing position of the image-capturing device 120. In one embodiment of the present invention, the virtual mask comprises the layout design of the object, or at least one set of alignment marks configured to align the object to a predetermined position on the substrate (submount). In one embodiment of the present invention, the processing module 131 is configured to generate the virtual mask by executing a computer-aided design (CAD) program. In one embodiment of the present invention, the display 132 is configured to display the virtual mask or the image of the object. In one embodiment of the present invention, the size and the portion of the virtual mask shown on the display 132 can be adjusted by considering at least the capturing position of the image-capturing device 120 from the position-sensing device 122, the feedback signal of the zoom controller 123, or the position of the stage 110 from the position-sensing device 122.

Figure 2A:
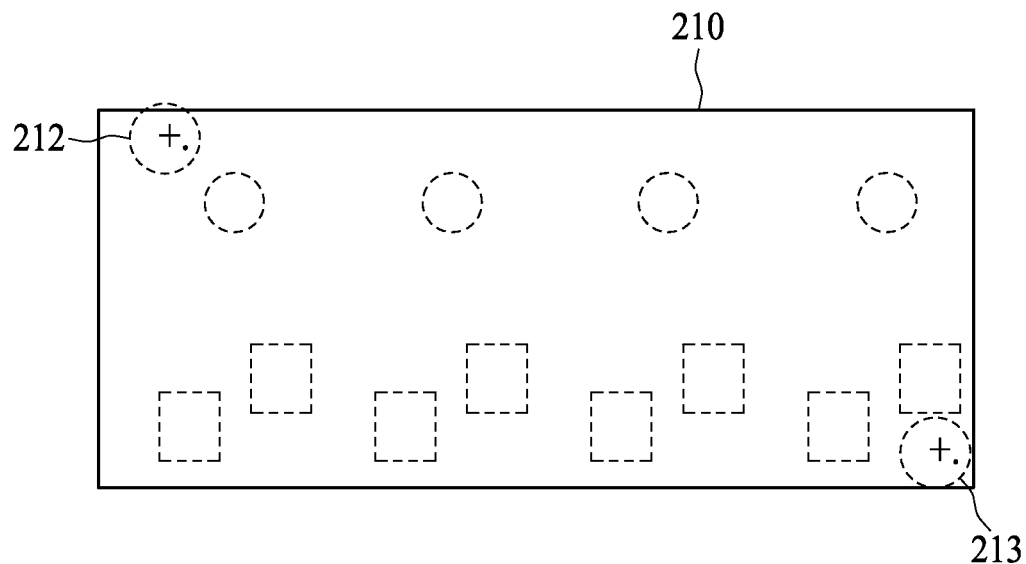
FIG. 2A illustrates a virtual mask with two sets of patterns according to one embodiment of the present invention.

FIG. 2A illustrates a virtual mask 210 according to one embodiment of the present invention. The virtual mask 210 comprises a layout design for four devices and one substrate, wherein one set of alignment marks 212 and 213 are configured to align the predetermined position on the substrate (submount). Persons having ordinary skill in the art will readily appreciate from the disclosure of the present invention that the spirit and scope of the present invention is not limited to the virtual mask 210 with four devices and two alignment marks 212 and 213.

Figure 2B:
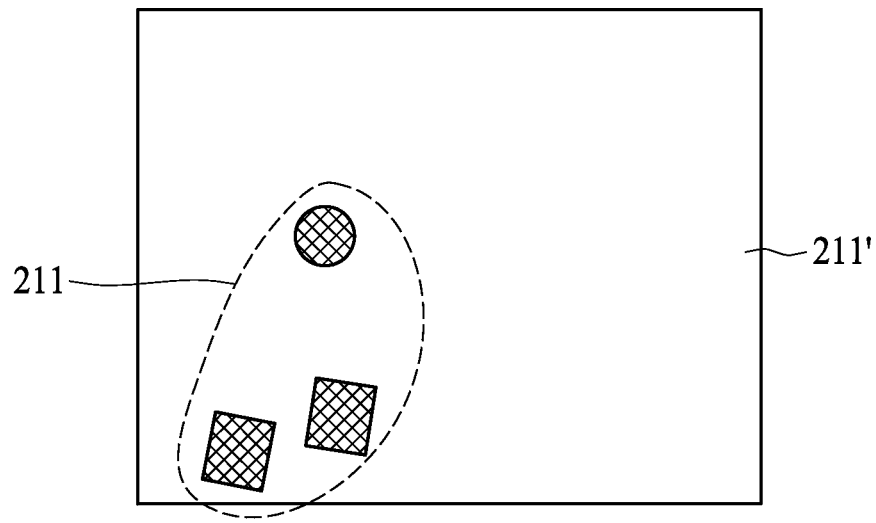
FIG. 2B illustrates a captured image of a real device according to one embodiment of the present invention.
Figure 3:
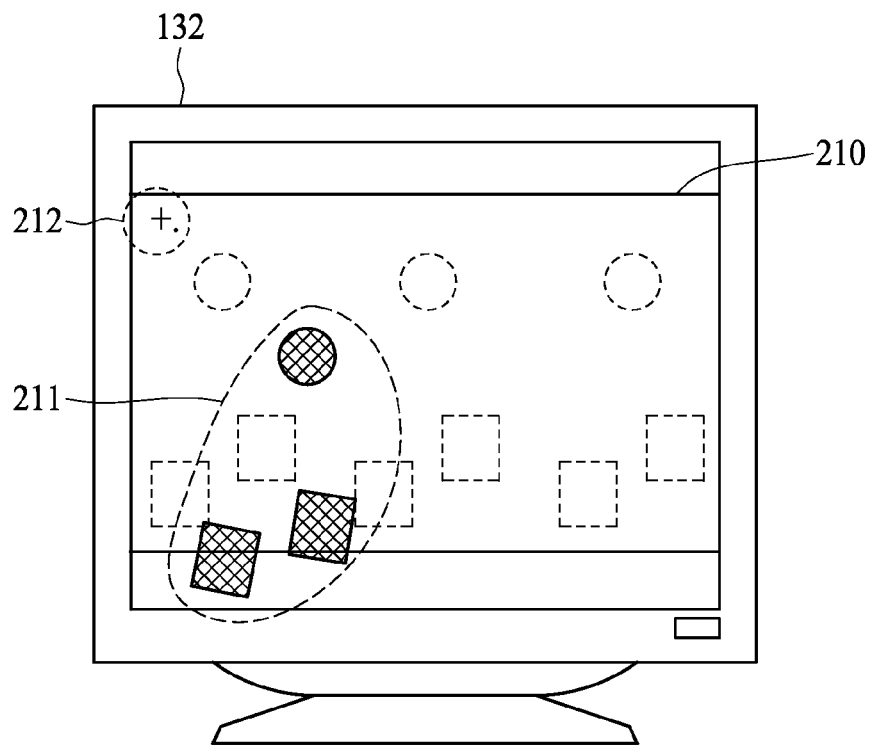
FIG. 3 illustrates the superimposing of the virtual mask with the captured image of the real device according to one embodiment of the present invention.
Figure 4:
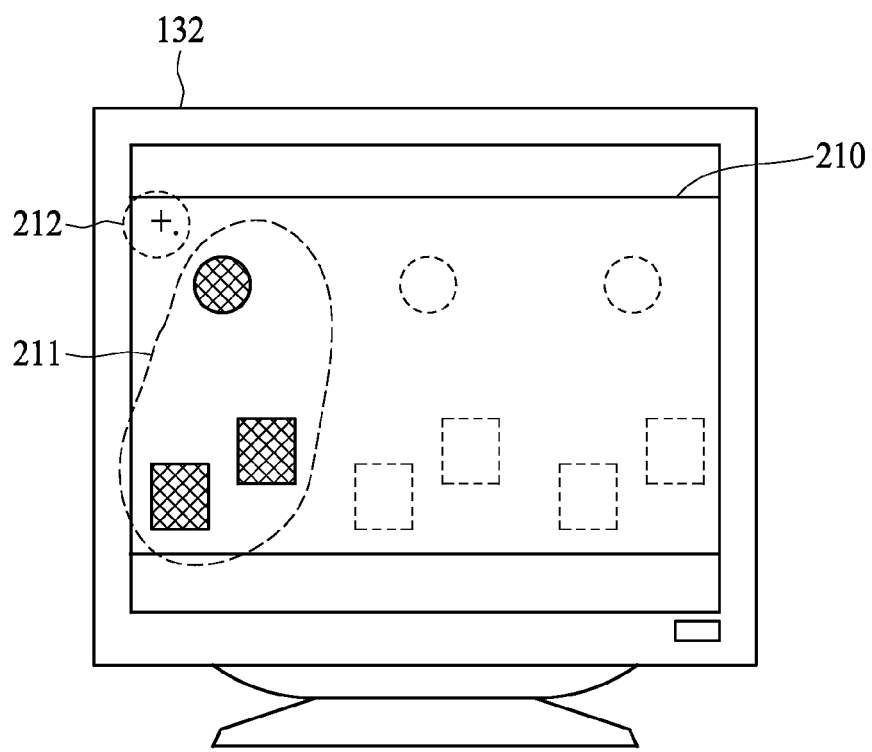
FIG. 4 illustrates a completed superimposing of the virtual mask with the captured image of the real device according to one embodiment of the present invention.

FIG. 2B illustrates a captured image 211' of a real device 211 according to one embodiment of the present invention, FIG. 3 illustrates the superimposing of the virtual mask 210 with the captured image 211' of the real device 211 according to one embodiment of the present invention, and FIG. 4 illustrates a completed superimposing of the virtual mask 210 with the captured image 211' of the real device 211 according to one embodiment of the present invention. In one embodiment of the present invention, the virtual mask system 100 adjusts the position or the inclined angle of the stage 110 to superimpose the left layout design of the virtual mask 210 with the captured image 211' of the real device 211. In one embodiment of the present invention, the position-sensing device 122 provides the lateral position of the virtual mask 210; in other words, the position-sensing device 122 can provide the relative moving distance between the microscope 124 and the stage 110 to the processing module 131 when the microscope 124 moves laterally, and the display 132 shows the relative movement of the virtual mask 210 correspondingly. For example, when the microscope 124 moves 20 µm to the right, the virtual mask 210 shown on the display 132 correspondingly moves 20 µm to the left, such that the operator can see alignment marks positioned in the outside of the original field of view.

Figure 5:
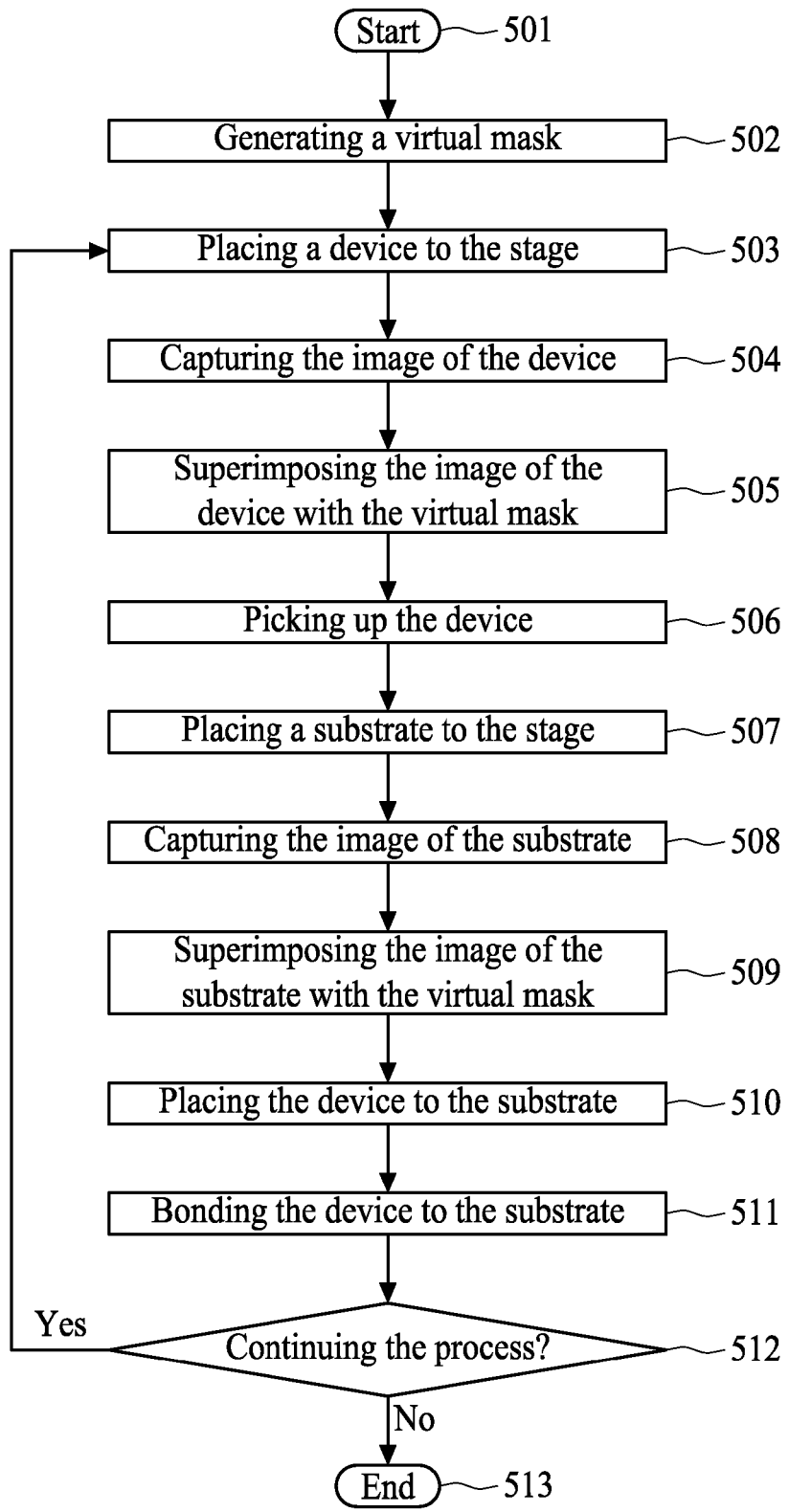
FIG. 5 illustrates the flow chart of the operation of the virtual mask system according to one embodiment of the present invention.

In one embodiment of the present invention, the present invention can be applied to the die bonding process. FIG. 5 illustrates the flow chart of the operation of the virtual mask system 100 according to one embodiment of the present invention. The flow chart starts at step 501, and a virtual mask is generated by executing a computer-aided design (CAD) program in step 502. As shown in FIG. 2A, the virtual mask 210 comprises a layout design of four devices and a substrate (submount). In one embodiment of the present invention, the virtual mask 210 comprises four device-aligning patterns and alignment marks 212 and 213 for substrate (submount) alignment.

In step 503, a device is placed onto the stage, wherein the device can be the Vertical-Cavity Surface-Emitting Laser (VCSEL) array or Photodiode (PD) array. In step 504, an image-capturing device is enabled to capture at least one image of the device, and the captured images can be different portions of the device by adjusting the stage position or the zooming rates of the microscope. In one embodiment of the present invention, the virtual mask can be magnified or reduced in response to the device such that ratio of the size of the virtual mask and that of the device is 1:1.

In step 505, the virtual mask is superimposed with the image of the device by adjusting the position or the inclined angle of the stage or by adjusting the capturing position of the image-capturing device by considering at least the virtual mask and the image of the device. In step 506, after the superimposing is completed, the device is picked up by a nozzle. In step 507, a substrate is placed on the stage. In step 508, the image-capturing device is enabled to capture at least one image of the substrate, and the captured images can be different portions of the device by adjusting the stage position or the zooming rates of the microscope.

In step 509, the virtual mask is superimposed with the image of the substrate by adjusting the position or the inclined angle of the stage or adjusting the capturing position of the image-capturing device by considering at least the virtual mask and the image of the substrate. In one embodiment of the present invention, the alignment marks 212 and 213 shown in FIG. 3 are configured to be reference points for the superimposing; the superimposing is completed when the alignment marks 212 and 213 superimpose the real marks of the substrate (not shown in the drawings). Persons having ordinary skill in the art will readily appreciate from the disclosure of the present invention that the virtual mask can serve as an absolute coordinate after the superimposing is completed. In one embodiment of the present invention, the image-capturing device may comprise a microscope such as a lens set or a reflective imaging lens set for capturing the image of the device or the substrate.

In step 510, the device is placed onto the substrate by the nozzle. In particular, the nozzle returns the device back to the previous position from which the nozzle picked the device up. In step 511, the device is bonded to the substrate. In step 512, it is determined whether to continue the process or not by repeating from step 503 and the flow is terminated if the checking result is false.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An alignment system, comprising:
    a stage configured to retain a first object and a second object;
    a virtual mask having a layout design of the first object, a layout design of the second object, and a relative position of the first object to the second object;
    an image-capturing device configured to capture at least one image of the first object and at least one image of the second object;
    a processing module configured to read the virtual mask for at least one alignment,
        wherein the processing module is configured to align the layout design of the first object of the virtual mask with the image of the first object for a first alignment, wherein the first object is placed according to the first alignment,
        wherein the processing module is configured to align the layout design of the second object of the virtual mask with the image of the second object for a second alignment, wherein the second object is placed according to the second alignment; and
    an apparatus configured to pick up the first object from the stage after the first alignment and to couple the first object with the second object after the second object is placed on the stage after the second alignment.

2. The alignment system of claim 1, wherein the image-capturing device comprises:
    an image sensor;
    a microscope positioned between the image sensor and the object;
    a position-sensing device configured to provide a capturing position where the image-capturing device captures the image of the first object;
    a zoom controller configured to control a zooming rate of the image-capturing device, wherein the processing module is configured to control the zooming rate and the size of the virtual mask and an image of the field of view of the microscope will be zoomed or reduced with the zooming rate.

3. The alignment system of claim 2, wherein the microscope is a lens set or a reflective imaging lens set.

4. The alignment system of claim 1, further comprising a display configured to display the virtual mask or the image of the first object.

5. The alignment system of claim 1, wherein the processing module is configured to read the virtual mask which was generated by executing a computer-aided design (CAD) program.

6. The alignment system of claim 1, wherein the captured image of the first object includes images of different portions of the object captured at different position of the microscope or at different zooming rates.

7. The alignment system of claim 1, wherein the virtual mask comprises a layout design of the first object and a layout design of the second object.

8. The alignment system of claim 1, wherein the virtual mask comprises at least one set of alignment marks.

9. The alignment system of claim 1, wherein the first object is a device, and the second object is a substrate.

10. The alignment system of claim 1, wherein the processing module is configured to control a position or an inclined angle of the stage or to control the capturing position of the image-capturing device by considering at least the virtual mask and the image of the first object.

11. A method for operating an alignment system, comprising the steps of:
    reading a virtual mask, wherein the virtual mask having a layout design of a first object, a layout design of a second object, and a relative position of the first object to the second object;
    placing the first object on a stage;
    capturing at least one image of the first object;
    aligning the layout design of the first object of the virtual mask with the image of the first object for a first alignment, wherein the first alignment includes adjusting a position of the first object until the layout design of the first object of the virtual mask is superpositioned with the image of the first object, wherein the position of the first object of the first alignment is recorded;
    picking up the first object from the stage after the first alignment is achieved;
    placing a second object on the stage;
    capturing at least one image of the second object;
    aligning the layout design of the second object of the virtual mask with the image of the second object for a second alignment, wherein the second alignment includes adjusting a position of the second object until the layout design of the second object of the virtual mask is superpositioned with the image of the second object, wherein the position of the second object of the second alignment is recorded; and
    placing the first object according to its recorded position of the first alignment to couple with the second object according to its recorded position of the second alignment.

12. The method for operating an alignment system of claim 11, wherein the at least one image of the first object includes images of different portions of the first object or at different zooming rates.

13. The method for operating an alignment system of claim 11, wherein the virtual mask is generated by executing a computer-aided design (CAD) program.

14. The method for operating an alignment system of claim 11, wherein the virtual mask comprises at least one set of alignment marks.

15. The method for operating an alignment system of claim 11, wherein the at least one image of the second object includes images of different portions of the second object or at different zooming rates.

16. The method for operating an alignment system of claim 11, wherein the virtual mask comprises at least a layout design of the first object and of the second object.

17. The method for operating an alignment system of claim 11, wherein the capturing of the at least one image of the first object or the second object is performed by using an image-capturing device equipped with a microscope.

18. The method for operating an alignment system of claim 17, wherein the microscope is a lens set or a reflective imaging lens set.

19. The method for operating an alignment system of claim 11,
    wherein the first object is a device.

20. The method for operating an alignment system of claim 11, wherein the second object is a substrate.

21. The method for operating an alignment system of claim 11, wherein the first object after the first alignment is then bonded with the second object after the second alignment.

* * * * *